(12) United States Patent
Mantell et al.

(10) Patent No.: US 8,992,857 B2
(45) Date of Patent: Mar. 31, 2015

(54) MIXING DEVICE AND MIXING METHOD

(71) Applicant: Xerox Corporation, Norwalk, CT (US)

(72) Inventors: David Allen Mantell, Rochester, NY (US); Peter Michael Gulvin, Webster, NY (US); Pinyen Lin, Rochester, NY (US); Andrew W Hays, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 98 days.

(21) Appl. No.: 13/741,355

(22) Filed: Jan. 14, 2013

(65) Prior Publication Data

US 2013/0127957 A1 May 23, 2013

Related U.S. Application Data

(63) Continuation of application No. 11/818,707, filed on Jun. 15, 2007, now Pat. No. 8,354,062.

(51) Int. Cl.
| B41J 2/215 | (2006.01) |
| B41J 2/15 | (2006.01) |
| B01J 19/00 | (2006.01) |
| B01F 5/00 | (2006.01) |
| B01F 5/18 | (2006.01) |
| B01F 13/00 | (2006.01) |
| B01F 15/02 | (2006.01) |
| B41J 2/175 | (2006.01) |
| B41J 2/165 | (2006.01) |

(52) U.S. Cl.
CPC ........... B01J 19/0093 (2013.01); B01F 5/0085 (2013.01); B01F 5/18 (2013.01); B01F 13/0059 (2013.01); B01F 15/0203 (2013.01); B01F 15/0255 (2013.01); B41J 2/175 (2013.01)
USPC .................. 422/502; 347/20; 347/40; 347/26

(58) Field of Classification Search
USPC .................................................. 422/521–523
See application file for complete search history.

(56) References Cited

U.S. PATENT DOCUMENTS

| 4,468,679 | A | 8/1984 | Suga et al. |
| 6,155,670 | A | 12/2000 | Weber et al. |
| 6,200,013 | B1 | 3/2001 | Takeuchi et al. |
| 6,420,196 | B1 * | 7/2002 | Silverbrook ..................... 438/21 |
| 6,478,414 | B2 | 11/2002 | Jeanmaire |
| 6,494,569 | B2 | 12/2002 | Koitabashi et al. |
| 6,641,622 | B2 * | 11/2003 | Sampson et al. ............ 23/294 R |
| 6,860,588 | B1 | 3/2005 | Holstun et al. |
| 6,932,502 | B2 | 8/2005 | Childers et al. |
| 7,021,739 | B2 | 4/2006 | Burke et al. |
| 7,288,469 | B2 | 10/2007 | Sharma et al. |
| 7,429,100 | B2 | 9/2008 | Pechtl |
| 7,461,927 | B2 | 12/2008 | Piatt et al. |
| 7,484,836 | B2 | 2/2009 | Moynihan |
| 7,695,105 | B2 | 4/2010 | Sung et al. |
| 2004/0046825 | A1 * | 3/2004 | Sugahara ........................ 347/21 |
| 2004/0263547 | A1 | 12/2004 | Sugahara |
| 2005/0168539 | A1 | 8/2005 | Billow et al. |
| 2006/0061636 | A1 * | 3/2006 | Moynihan ....................... 347/84 |
| 2006/0119669 | A1 * | 6/2006 | Sharma et al. ................. 347/82 |
| 2006/0192805 | A1 | 8/2006 | Eguchi et al. |

* cited by examiner

Primary Examiner — Jill Warden
Assistant Examiner — Brittany Fisher
(74) Attorney, Agent, or Firm — MDIP LLC

(57) ABSTRACT

A mixing method and device are disclosed. The mixing method includes providing a drop generating device including a first drop ejector, a second drop ejector and a collector. The mixing method also includes ejecting a plurality of drops of a first reactant from the first drop ejector and ejecting a plurality of drops of a second reactant from the second drop ejector and collecting the drops with the collector.

7 Claims, 2 Drawing Sheets

MIXING DEVICE AND MIXING METHOD

BACKGROUND

1. Technical Field

The present disclosure relates to a mixing device and mixing method, and more particularly relates to creating drops of reactants that are mixed.

2. Background of Related Art

Microreactors are used for the manufacture of chemicals and typically provide rapid prototyping and potential for scale up and manufacturing. Microreactors are relatively small in size and have continuous throughput, so they are advantageously used to provide speed of chemical reactions, yield and ability to handle highly exothermic reactions.

Mixers are one of the potential components of microreactor systems. To form a chemical reaction, the ingredients or reactants are typically mixed. An increased mixing rate in microreactors is often desirable because the rate of mixing is often the rate limiting step in reactions. Furthermore, the non-uniformities of mixing can hurt the yield of a reaction. The small dimensions of a typical microreactor are beneficial because the length over which mixing occurs is shorter, with respect to a conventional batch reactor, thus creating a faster mixing rate. Nevertheless, even on a small scale, bringing two streams of liquids or reactants together, often creates laminar flows and a single interface, over which diffusion becomes the rate limiting step.

Accordingly, increasing the mixing rate in microreactors is desired.

SUMMARY

The present disclosure relates to a mixing method. The mixing method includes providing a drop generating device including a first drop ejector, a second drop ejector and a collector. The mixing method also includes ejecting a plurality of drops of a first reactant from the first drop ejector and ejecting a plurality of drops of a second reactant from the second drop ejector and collecting the drops with the collector.

The present disclosure also relates to a mixing device including a printhead, a first drop ejector, a second drop ejector and a collector. The first drop ejector is disposed in mechanical cooperation with the printhead and is configured to eject a plurality of drops of a first reactant. The second drop ejector is disposed in mechanical cooperation with the printhead and is configured to eject a plurality of drops of a second reactant. The collector is configured to receive the plurality of drops of the first reactant and the plurality of drops of the second reactant.

The present disclosure also relates to a mixing device including a first printhead, a second printhead and a collector. The first printhead includes a first drop ejector configured to eject a plurality of drops of a first reactant. The second printhead includes a second drop ejector configured to eject a plurality of drops of a second reactant. The collector is configured to receive the plurality of drops of the first reactant and the plurality of drops of the second reactant.

DESCRIPTION OF THE DRAWINGS

Embodiments of the presently disclosed mixing device are disclosed herein with reference to the drawings, wherein.

DETAILED DESCRIPTION

Figure 1:
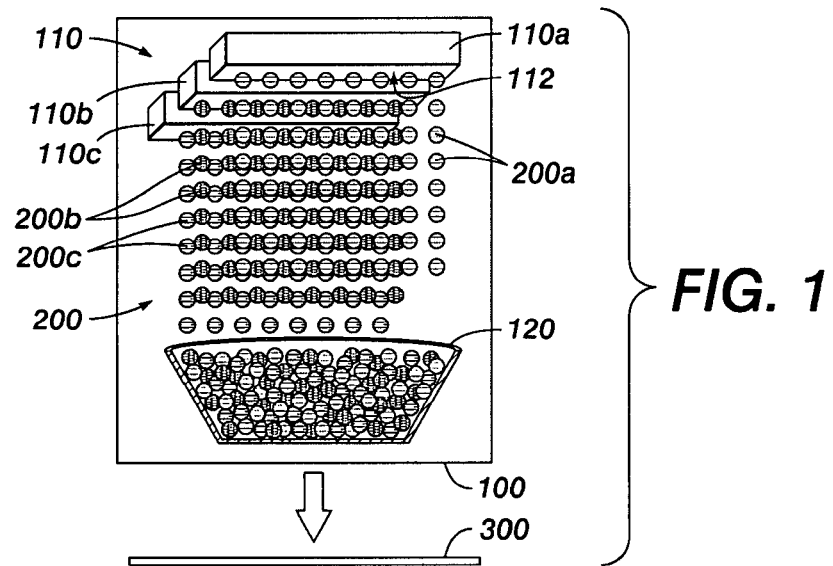
FIG. 1 is a schematic view of a printhead according to an embodiment of the present disclosure.

Embodiments of the presently disclosed mixing device and mixing method are now described in detail with reference to the drawings, in which like reference numerals designate identical or corresponding elements in each of the several views.

A printhead (e.g., a piezo inkjet printhead) in accordance with the present disclosure is referred to in the figures as reference numeral 100. Referring initially to FIG. 1, printhead 100 includes an array of drop ejectors 110 and a collector 120. Array of drop ejectors 110 is illustrated including a first drop ejector 110a, a second drop ejector 110b and a third drop ejector 110c. It is envisioned that more or fewer drop ejectors 110 may be included in printhead 100. Collector 120 is configured to receive reactants 200 (or reagents) ejected from array of drop ejectors 110.

Array of drop ejectors 110 is configured to eject a plurality of drops of reactants 200, including a first reactant 200a, a second reactant 200b and/or a third reactant 200c (it is contemplated that more reactants 200 may also be ejected from array of drop ejectors 110). It is envisioned that reactants 200 are ejected from array of drop ejectors 110 via pulsed sources to facilitate the formation of drops. It is further envisioned that the use of relatively small volumes of reactants 200 (e.g., via drops vis-à-vis streams) efficiently mixes reactants 200 at least partially on the scale of the drop size because of the association of interdigitated drops.

Figure 2:
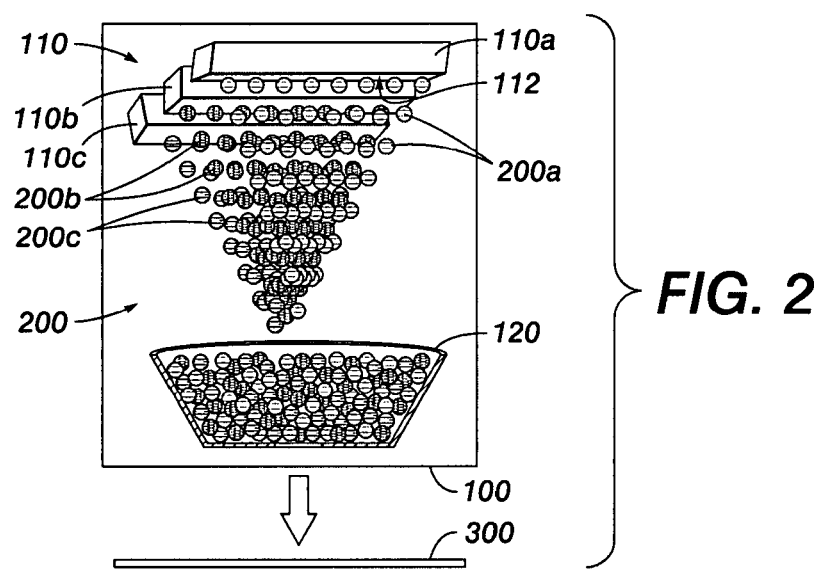
FIGS. 2 and 3 are schematic views of embodiments of the printhead of FIG. 1 in accordance with the present disclosure.
Figure 3:
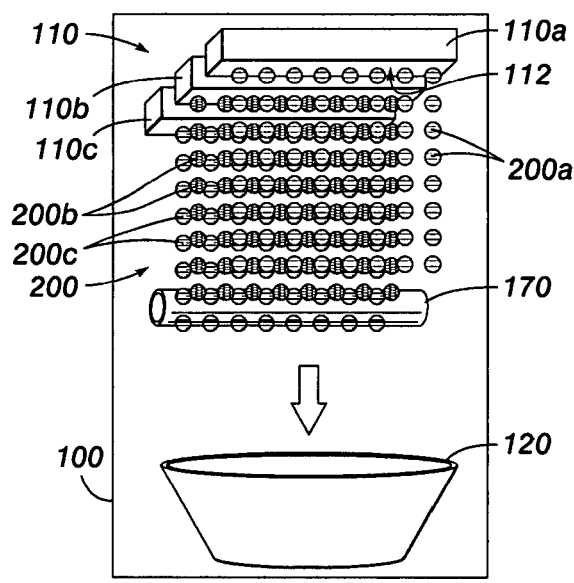

With reference to FIGS. 1-3, printhead 100 is configured such that drops of reactants 200 (e.g., first reactant 200a, second reactant 200b and/or third reactant 200c) are at least partially mixed with one another after being ejected from array of drop ejectors 110 and before contacting collector 120. For example, reactants 200 are mixed when they are airborne between array of drop ejectors 110 and collector 120. Thus, reactants 200 are inter-mixed and/or premixed (e.g., forming an initially dispersed liquid) upon contacting collector 120 and form an inked image thereon. As can be appreciated, inter-mixing drops of reactants 200 may automatically create an initially dispersed liquid. Consequently, collector 120 may be able to more easily process or fully mix the reactants.

Creating paths for drops of reactants 200 to inter-mix and/or premix may be achieved in several ways. This is accomplished in one embodiment by reactants 200 (e.g., 200a and 200b) being initially disposed on/within different drop ejector arrays 110 (e.g., 110a and 110b) that are tilted towards each other or opposed to each other. Additionally or alternatively, reactants 200 may be disposed on/within a single printhead 100. Here, reactants 200 can be angled toward each other, for example, to facilitate the mixing process.

Mixing of reactants 200 disposed from drop ejector arrays 110 may be achieved in several ways. To achieve inter-mixing (or interdigitating) of reactants 200, it is envisioned that drop ejectors 110a, 110b and/or 110c are configured (e.g., angled) to direct drops of reactants 200 towards one another. It is also envisioned that a plurality of nozzles 150 is disposed on array of drop ejectors 110 (e.g., each drop ejector array 110a, 110b and 110c) to facilitate the inter-mixing of at least two of first reactant 200a, second reactant 200b and third reactant 200c.

Once reactants 200 combine (e.g., while airborne), they are carried by momentum and/or gravity to a location where they are collected for use (e.g., collector 120) or for further processing (e.g., a drum 170, as described below). In the embodiments where drops of reactants 200 are traveling in opposed or somewhat opposed directions to one another, the net momentum may be relatively low, thus manipulation of reactants 200 by external forces (e.g., via an air stream or charging droplets and moving them by electromagnetic fields) may be helpful to move reactants 200 to a collection location or to encourage pre-mixing of the drops.

Figure 4:
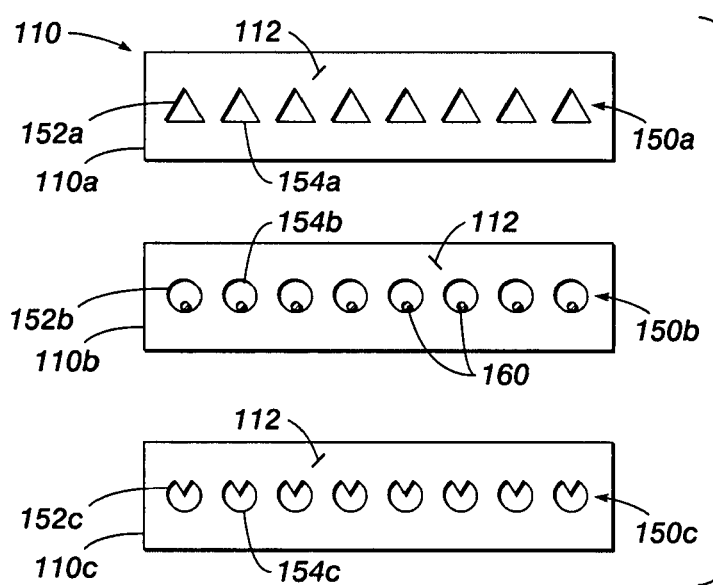
FIG. 4 is an enlarged plan view of an array of drop ejectors of the printheads of FIGS. 1-3, according to embodiments of the present disclosure.

A contemplated embodiment is shown with reference to FIG. 4. Here, array of drop ejectors 110 is illustrated with first drop ejector 110a and third drop ejector 110c having nozzles 150a and 150c, respectively, with an asymmetric cross-section. Nozzles 150a include an asymmetric cross-section that resembles a non-equilateral triangle. Nozzles 150c includes an asymmetric cross-section that resembles a circular shape having a notch therein. As used herein, the terms asymmetric and asymmetrical relate to a shape that is not symmetrical about a point. Accordingly, drops of reactants 200 can be ejected from nozzles 150 with an asymmetric cross-section at an angle that is not perpendicular to a face 112 of drop ejector 110. One contemplated method would be to vary the film coating of a nozzle on different sides or to different depths at different points around the opening of the nozzle. Thus an asymmetry in the way the liquid pins to the edge of the nozzle or the depth to which it pins inside the nozzle is created is used to alter the flight paths for drops. As can be appreciated, that asymmetry of nozzles 150 of each drop ejector illustrated figuratively as 110a, 110b, 110c can be altered to produce a desired flight path for drops of reactants 200. While only three asymmetric shapes of cross-sections of nozzles 150 are illustrated (including nozzles 150b), it is envisioned that other asymmetry can be used to create a desired path for drops of reactants 200.

With continued reference to FIG. 4, another contemplated example of creating paths for drops of reactants 200 to intermix and/or premix is illustrated. In this embodiment, with specific reference to drop ejector 110b, a heating element 160 is disposed adjacent a portion of nozzles 150b. Heating element 160 can heat portions (i.e., asymmetric heating) drops of reactants (e.g., 200b), to alter the local viscosity of reactant 200b. Here, the ejection angle of drops of reactants 200b may be controlled by varying the amount of asymmetric heating by heating element 160. To accommodate a variety of reactants 200, the amount of heating necessary to achieve an appropriate ejecting (or jetting) angle can be determined and implemented for a given reactant 200 or group of reactants.

In addition to airborne mixing of drops of reactants 200, as described above, it is also envisioned to mix drops of reactants 200 by causing at least two drops of reactants to contact substantially the location of collector 120. For instance, FIG. 2 illustrates drops of reactants 200a, 200b and 200c all contacting substantially the same location of collector 120. It is also envisioned that drops of reactants 200a from a first nozzle 152a of nozzles 150a combine with drops of reactants 200b from a first nozzle 152b of nozzles 150b and/or combine with drops of reactants 200c from a first nozzle 152c of nozzles 150c at substantially the same location on collector 120. Here, drops of reactants 200a from a second nozzle 154a of nozzles 150a combine with drops of reactants 200b from a second nozzle 154b of nozzles 150b and/or combine with drops of reactants 200c from a second nozzle 154c of nozzles 150c at substantially the same location on collector 120. In this particular embodiment reactants 200a, 200b, 200c combine with one another on different locations on collector 120. That is, instead of combining at a single location on collector 120, reactants 200a, 200b, 200c combine at the same number of locations as there are number of individual nozzles per drop ejector 110a, 110b and/or 110c. In this embodiment, it is envisioned that reactants 200a, 200b, 200c are still able to properly mix even if reactants 200 arrive at different points of time and/or if a the ejecting process is not optimally controlled.

Referring to FIG. 3, a drum 170, which serves as a component of the collector, is illustrated between array of drop ejectors 110 and a subsequent stage of the collector 120. Reactants 200 are mixed in this embodiment by being deposited on the drum 170 (e.g., that is rotating) at the same or nearby locations. Reactants 200 are then removed (e.g., scraped) from drum 170 and are collected by the subsequent stage of the collector 120. Here, the reactants may continue to mix in the process of removing the different reactants 200a, 200b, 200c. Thus, when reactants 200 reach the subsequent stage of the collector 120, reactants 200 are already mixed, or at least partially mixed. Alternatively, a functional substrate could be attached to the drum. The reactants reacting to form a functional layer on that substrate or with further processing (e.g. heating) will form a functional layer on that substrate.

In accordance with the present disclosure, it is envisioned that first reactant 200a and second reactant 200b are configured to form a product upon mixing. For example, first reactant 200a may be essentially comprised of vegetable oil and a second reactant 200b may be essentially comprised of lye and alcohol. It is envisioned that mixing vegetable oil and lye and alcohol may result in a mixture containing diesel fuel. It is also contemplated that a third reactant 200c is configured to either contribute to the reaction, to catalyze the reaction, or to stabilize the mixture of first and second reactants 200a, 200b upon mixing therewith.

It is envisioned that between about 100 and about 50,000 ejectors 150 are included in arrays of ejectors 110 and that each nozzle 150 is configured to eject reactants 200 of between about 1 pL and about 25 pL at a rate of at least about 20 kHz. Improvements in printhead design may increase the number of available ejectors, decrease the volume of drops, and/or increase the rate of drop ejection.

In accordance with the present disclosure, it is envisioned that first reactant 200a and second reactant 200b may be configured to form a higher viscosity product upon mixing (e.g., form a solid).

A mixing method is also contemplated by the present disclosure. An embodiment of this method includes providing a printhead 100 (e.g., as described above), and ejecting a plurality of drops of first reactant 200a and a plurality of drops of second reactant 200b from array of drop ejectors 110.

It is envisioned that a printhead 100 and its associated methods help allow for a pseudo-continuous mixing process and efficient heat dissipation.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

We claim:
1. A mixing device, comprising:
  a printhead;
  a first independent drop ejector disposed in mechanical cooperation with the printhead comprising a first set of nozzles, wherein said first set of nozzles are configured to be substantially uniform in size, and wherein the first drop ejector is configured to eject a plurality of drops of a first reactant;

a second independent drop ejector disposed in mechanical cooperation with the printhead comprising a second set of nozzles, wherein said second set of nozzles are configured to be substantially uniform in size, and wherein said second drop ejector is configured to eject a plurality of drops of second reactant;

a heating element asymmetrically disposed in at least one of said nozzles; and a collector to receive the reactants of the first and second drop electors, wherein the first and second set of nozzles are configured at an angle to mix the first and second reactants prior to being received by the collector to form an inked image thereon after ejection from the first and second drop ejectors.

2. The mixing device of claim 1, wherein said nozzles are configured to contain a transverse cross-section that is asymmetrical about a center point.

3. The mixing device of claim 1, wherein the first set of nozzles and the second set of nozzles have a different shape.

4. The mixing device of claim 1, wherein the first and second independent drop ejectors are tilted toward a common perpendicular axis such that the collector collects substantially all of the drops.

5. The mixing, device of claim 1, further comprising a drum in mechanical cooperation with said collector, wherein said drum is disposed below said first and second ejectors and between said collector an said ejectors.

6. The mixing device of claim 1, wherein said first independent ejector and said second independent ejector are configured to be angled toward the center axis of said collector.

7. The mixing device of claim 1, further comprising a third independent drop ejector disposed in mechanical cooperation with the printhead comprising a third, set of nozzles, wherein said third set of nozzles are configured to be substantially uniform in size, and wherein the third drop ejector is configured to eject a plurality of drops of a third reactant.

* * * * *